United States Patent [19]

Gaiser

[11] Patent Number: 4,514,983
[45] Date of Patent: May 7, 1985

[54] MASTER CYLINDER ATTACHMENT FOR PLASTIC RESERVOIR

[75] Inventor: Robert F. Gaiser, Stevensville, Mich.

[73] Assignee: Allied Corporation, Morristown, N.J.

[21] Appl. No.: 433,179

[22] Filed: Oct. 6, 1982

Related U.S. Application Data

[63] Continuation of Ser. No. 193,764, Oct. 3, 1980, abandoned.

[51] Int. Cl.³ ............................................. B60T 11/20
[52] U.S. Cl. ..................................... 60/562; 60/585; 220/20; 220/353
[58] Field of Search ................. 60/585, 588, 589, 592, 60/562; 220/20, 69, 307, 353

[56] References Cited

U.S. PATENT DOCUMENTS

| 3,479,068 | 11/1969 | Brittain | 60/585 |
| 3,886,747 | 6/1975 | Harwick | 60/585 |
| 4,004,707 | 1/1977 | Snyder | 188/345 |
| 4,005,796 | 2/1977 | Hirai | 60/562 |
| 4,047,048 | 9/1977 | Demido | 200/84 R |
| 4,133,287 | 1/1979 | Downs | 60/534 |
| 4,289,162 | 9/1981 | Nomura | 60/592 |

FOREIGN PATENT DOCUMENTS

| 485976 | 10/1976 | Australia . | |
| 498927 | 5/1978 | Australia . | |
| 1655406 | 7/1973 | Fed. Rep. of Germany | 60/585 |
| 2817885 | 11/1978 | Fed. Rep. of Germany . | |
| 1194139 | 11/1959 | France . | |
| 2408493 | 6/1979 | France | 60/585 |
| 156975 | 11/1979 | Japan | 60/592 |
| 1245880 | 9/1971 | United Kingdom | 60/585 |
| 2032551 | 5/1980 | United Kingdom | 60/585 |

Primary Examiner—Abraham Hershkovitz
Attorney, Agent, or Firm—Larry J. Palguta; Ken C. Decker

[57] ABSTRACT

A master cylinder comprises a plastic reservoir (24) and a metal housing (26). The housing defines a support portion (40) with slots (64, 66) and the reservoir includes integral tabs (76, 78) which extend into the slots to attach the reservoir to the housing. The tabs also locate a boss (72) relative to a stepped bore (50) during assembly of the reservoir and housing.

3 Claims, 4 Drawing Figures

MASTER CYLINDER ATTACHMENT FOR PLASTIC RESERVOIR

This is a continuation of application Ser. No. 193,764, filed Oct. 3, 1980, now abandoned.

The invention relates to a master cylinder in a brake system. The master cylinder includes a reservoir for storing fluid and a housing bore receives a pair of pistons. During a brake application the pair of pistons pressurize fluid trapped within the housing bore to communicate fluid pressure to a set of brake assemblies.

When the housing is made from a metal and the reservoir is made from a plastic, the reservoir includes a pair of bosses which are received in respective housing openings and a pair of specially designed rubber grommets are carried by the reservoir or housing to seal the fluid communication established between the reservoir and housing. With the rubber grommet carried by the metal housing, the metal housing requires machining to provide a recess for receiving the rubber grommet. Also, the rubber grommet is carried by the housing to sealingly engage the vertically extending bosses. Because of the vertical dimension required by the rubber grommet, the resulting connection between the plastic reservoir and the metal housing adds to the overall height of the master cylinder.

The present invention relates to an improvement in the connection between a plastic reservoir and a metal housing in a master cylinder. In particular, the plastic reservoir is provided with a pair of integrally formed tabs and the metal housing is provided with a support portion mounting the plastic reservoir and releasably connecting with the pair of tabs. The support portion includes a pair of slots for receiving respective tabs and the walls of the slots are engageable with the tabs to locate a boss on the plastic reservoir with an opening on the metal housing. The opening defines a stepped bore and the boss cooperates with the wall of the stepped bore to substantially define an annular groove for receiving an O-ring seal. A bottom outer wall of the plastic reservoir is engageable with the support portion when the pair of tabs are connected to the support portion. The support portion extends transversely from a cylindrical portion of the housing to engage a substantial width of the plastic reservoir bottom wall. In order to prevent disconnection of the pair of tabs from the support portion of the housing, the plastic reservoir further includes one or more integrally formed ridges on the inside of the plastic reservoir substantially opposite the pair of tabs. Movement of the tabs to a release position requires slight deformation of the ridges, and the rigidity of the ridges opposes movement of the pair of tabs to their release position.

Advantages gained from the invention are a reduction in the overall height of the master cylinder assembly, a reduction in cost as evidenced by the applicability of an O-ring seal rather than a specially designed grommet, and the elimination of machining operations for the metal housing.

One way of carrying out the invention is described in detail in the following text with reference to the drawings.

Figure 1:
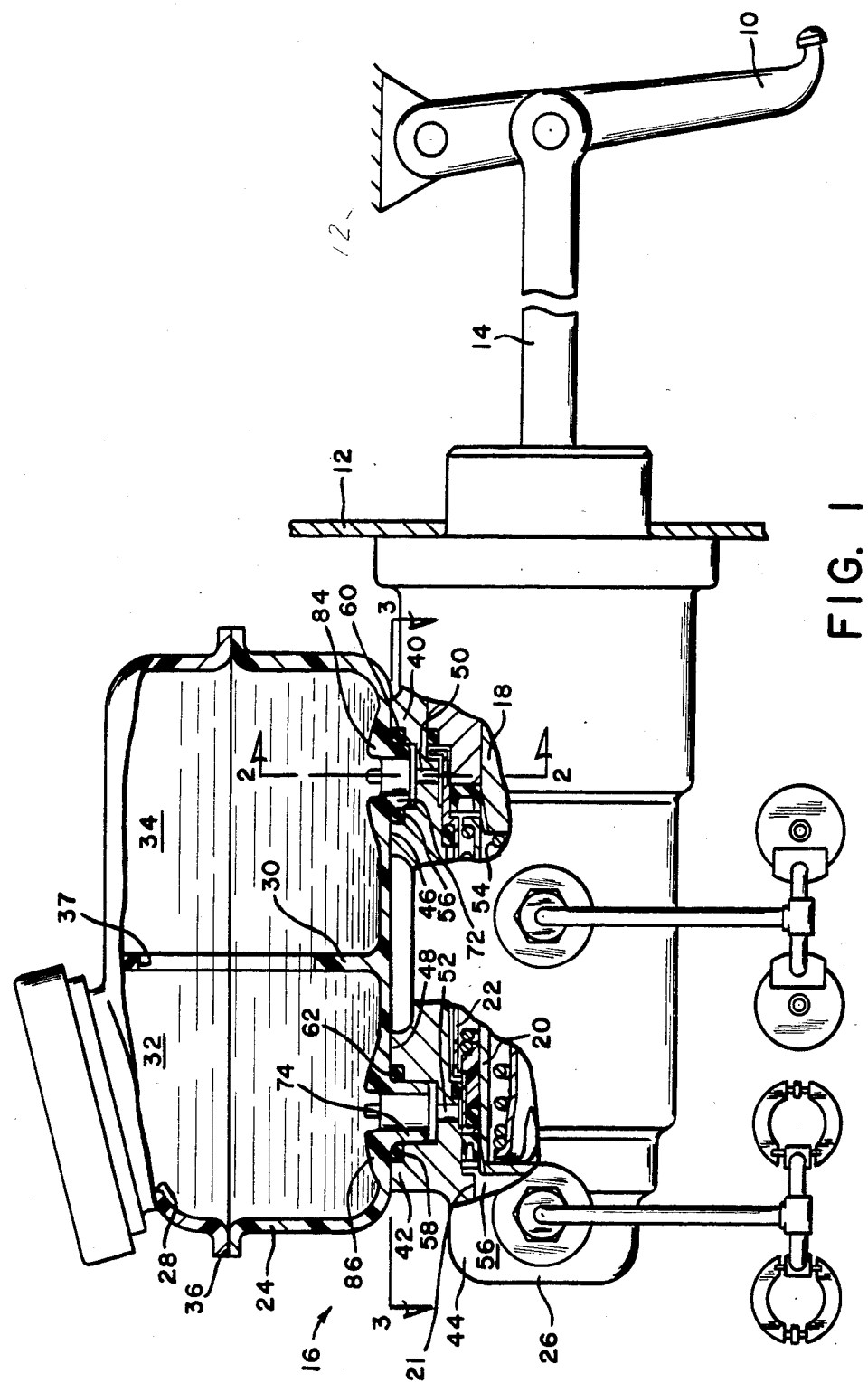
FIG. 1 is a longitudinal side view of a master cylinder assembly, partly in cross section, constructed in accordance with the invention.

In the brake system illustrated in FIG. 1, a brake pedal 10 is pivotally secured to a portion of a vehicle frame 12 to control movement of an input rod 14. A master cylinder 16 is also secured to the frame 12, albeit a different portion, and the input rod 14 extends into the master cylinder to control movement of a pair of pistons 18 and 20 within a bore 22 of the master cylinder.

The master cylinder 16 comprises a plastic reservoir 24 and a metal housing 26. The reservoir 24 includes a fill opening 28 for receiving brake fluid. An inner wall 30 separates the inside of the reservoir into a pair of cavities 32 and 34 and a slot 37 on the inner wall 30 permits communication of fluid from cavity 32 to cavity 34 so long as the fluid level is above a predetermined height. Preferably, the reservoir 24 is formed from a top plastic part defining the fill opening 28 and a bottom plastic part cooperating with the housing in a manner described hereinafter. The parts are joined via suitable means at the interface 36.

Figure 3:
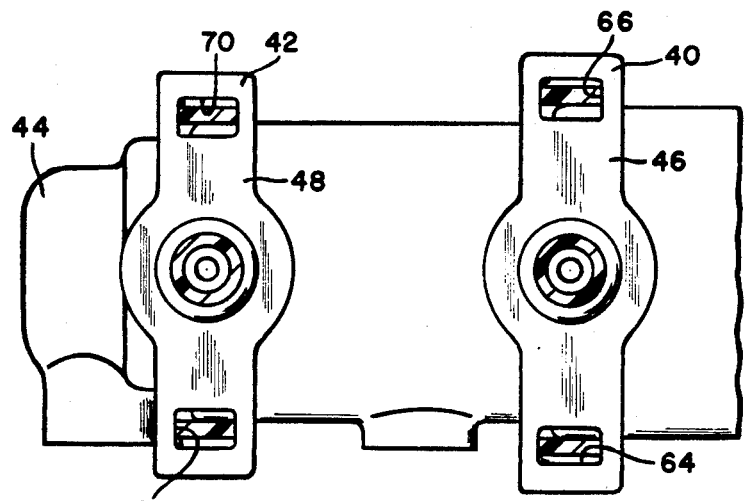
FIG. 3 is a cross sectional view taken along line 3—3 of FIG. 1.

The housing 26 is made from a metal, such as aluminum, which can be die cast to form the bore 22. As shown in FIG. 3, the housing is also formed with a pair of transversely extending support portions 40 and 42 which define transverse lengths larger than a cylindrical portion 44 of the housing. The portions 40 and 42 are intersected by respective stepped bores 50 and 52 leading from the bore 22. The piston 18 cooperates with the bore 22 to substantially form a primary pressure chamber 54 communicating with bore 50 in the rest position illustrated, while the piston 20 cooperates with a reduced portion 21 of the bore 22 to substantially form a secondary pressure chamber 56 communicating with the bore 52 in the rest position illustrated. Each housing bore 50 and 52 is stepped to define a respective groove 56 and 58 adjoining the flat surfaces 46 and 48. O-ring seals 60 and 62 are disposed within the respective grooves 56 and 58.

Figure 2:
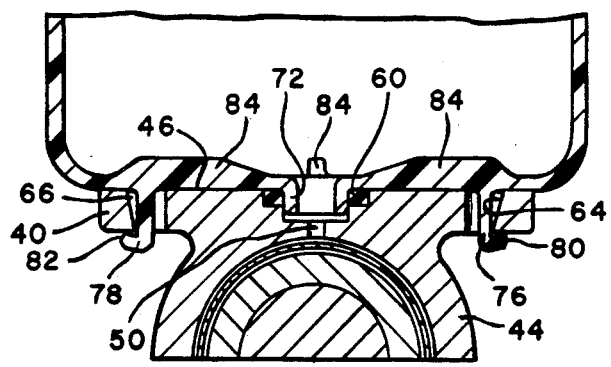
FIG. 2 is a cross sectional view taken along line 2—2 of FIG. 1.

In order to connect the reservoir with the housing, the transversely extending portions 40 and 42 are provided with slots 64, 66 and 68, 70. The outer walls of each slot are tapered inwardly from top to bottom for a purpose to be described hereinafter. The plastic reservoir includes integrally formed bosses 72 and 74 and integrally formed tabs 76 and 78 associated with boss 72. The tabs associated with boss 74 are not shown, however these tabs are similar in structure and function to the tabs 76 and 78, so that the following description is equally applicable to the tabs associated with boss 74. Turning to FIG. 2, the tab 76 extends through the slot 64 and a hook 80 at the end of tabs 76 is engageable with the bottom surface of the support portion 40 to lock the tab 76 to the support portion 40. Similarly, the tab 78 extends through the slot 66 and a hook 82 at the end of tab 78 is engageable with the bottom surface of the support portion 40. From FIG. 2 it is seen that the support portion 40 is wider than the width defined between the tabs 76 and 78. When the tabs 76 and 78 are disposed within the slots 64 and 66, the boss 72 is disposed within the opening 50. Also, the bottom surface of the reservoir is engaged with the flat surface 46 of the support portion and also sealingly engaged with the O-ring seal 60.

Figure 4:
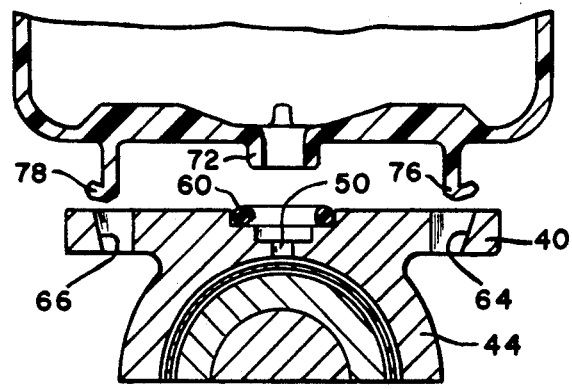
FIG. 4 is an exploded view of the cross sectional view of FIG. 2.

Prior to assembly of the reservoir and housing as shown in FIG. 4, the tabs 76 and 78 are engageable with the tapered walls of the slots 64 and 66 before the boss 72 is disposed within the stepped bore 50. Forcing the reservoir toward the housing causes the tabs to move into the slots thereby deflecting the tabs inwardly. The engagement between the tabs and the walls of the slots causes the boss 72 to align with the bore 50. Once the hooks extend from the slots on the bottom side of the support portion 40, the tabs spring outwardly to engage the hooks 80 and 82 with the bottom side of the support portion 40.

Due to the inherent rigidity of the plastic tabs, the tabs will remain in the position illustrated in FIG. 2. In order to further insure that the tabs will remain in this attached position, the reservoir includes a plurality of ridges 84 extending from the inside of the reservoir adjacent the boss 72 and another plurality of ridges 86 extending from the inside of the reservoir adjacent the boss 74. The ridges add to the rigidity of the reservoir at the location of the bosses 72 and 74 and also at the location of the tabs. Consequently, the tabs will not freely contract inwardly to permit unwanted separation of the reservoir from the housing. And if during repair the tabs are forced inwardly to separate the reservoir from the housing, the ridges will strengthen the portion of the housing at the bosses and tabs to enable repeated connection and disconnection of the reservoir and housing without damage or distortion of the reservoir.

In conclusion, the support portions 40 and 42 are maintained in engagement with a substantial width of the bottom wall of the reservoir when the tabs are hooked to the support portion. Consequently, movement of the reservoir relative to the housing is eliminated. Therefore, the O-ring seals 60 and 62 are maintained in a static loaded condition. The O-ring seals could be statically loaded in a vertical direction, so that the horizontal width of grooves 56 and 58 is greater than the horizontal width defined by each O-ring seal, whereas the vertical depth of each groove 56 and 58 is less than the vertical thickness of each O-ring seal. In the alternative, the O-ring seals could also be statically loaded in a horizontal direction.

I claim:

1. In a master cylinder assembly having a housing movably supporting a pair of pistons which are movable axially therein, the pair of pistons cooperating with the housing to substantially define a pair of pressure chambers, the housing defining a pair of openings leading radially to the pair of pressure chambers, a plastic reservoir substantially defining a pair of cavities which communicate fluid stored in the plastic reservoir to respective pressure chambers via a pair of ports defined by the plastic reservoir, and sealing means between the plastic reservoir and the housing to substantially prevent leakage from the communication of fluid between the pair of cavities and the pair of pressure chambers, characterized by said plastic reservoir including at least one integrally formed boss extending into one of said housing openings, said one boss cooperating with said housing to substantially define a groove for receiving said sealing means, and said plastic reservoir also including at least one tab extending outwardly in the same direction as said one boss, said one tab releasably engaging said housing to retain said one boss within said one opening and lock said plastic reservoir to said housing in the absence of further parts, thereby maintaining said sealing means in sealing engagement with said plastic reservoir and said housing, and said one tab cooperating with said housing during attachment of said plastic reservoir to said housing to substantially align said one boss with said one housing opening before said sealing means is engageable with said housing and said plastic reservoir in order to permit the attachment of said plastic reservoir to said housing to proceed in a radial direction to said housing.

2. The master cylinder of claim 1 further characterized by said plastic reservoir including at least one ridge disposed on the inside of said plastic reservoir, said one ridge being substantially opposite said one tab and cooperating with said plastic reservoir to oppose separation of said one tab from said one transversely extending flange.

3. The master cylinder of claim 2 further characterized by said one ridge cooperating with said plastic reservoir to oppose withdrawal of said one integrally formed boss from said one housing opening so long as said one tab remains in engagement with said one transversely extending flange.

* * * * *